United States Patent Office 3,444,881
Patented May 20, 1969

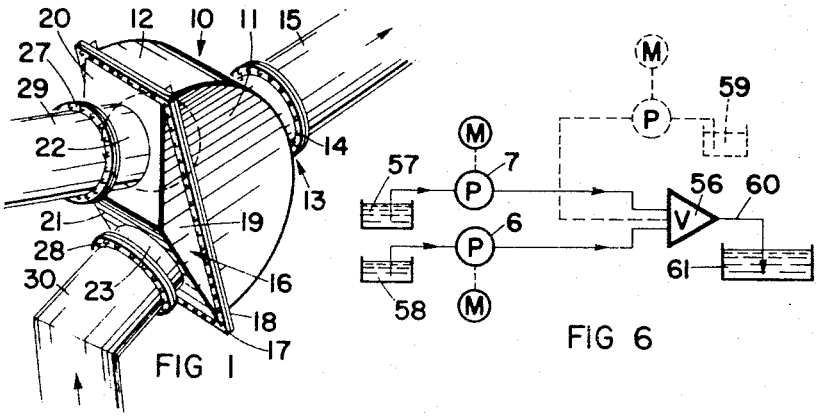
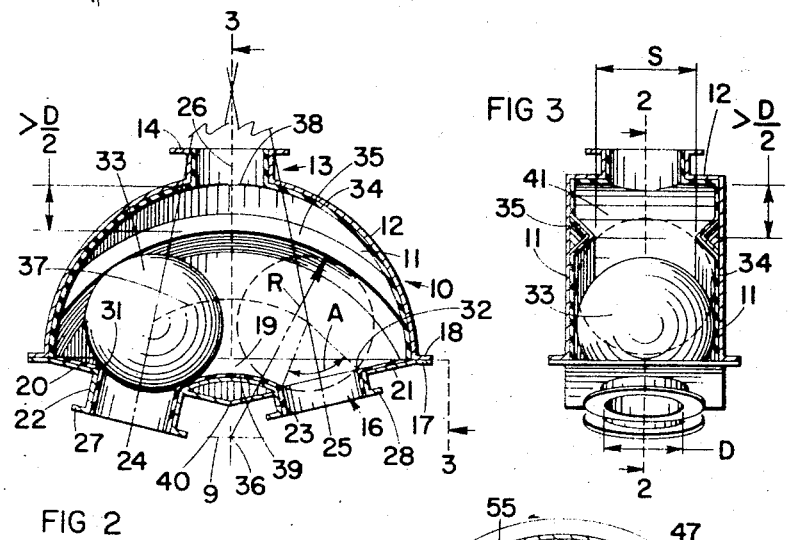
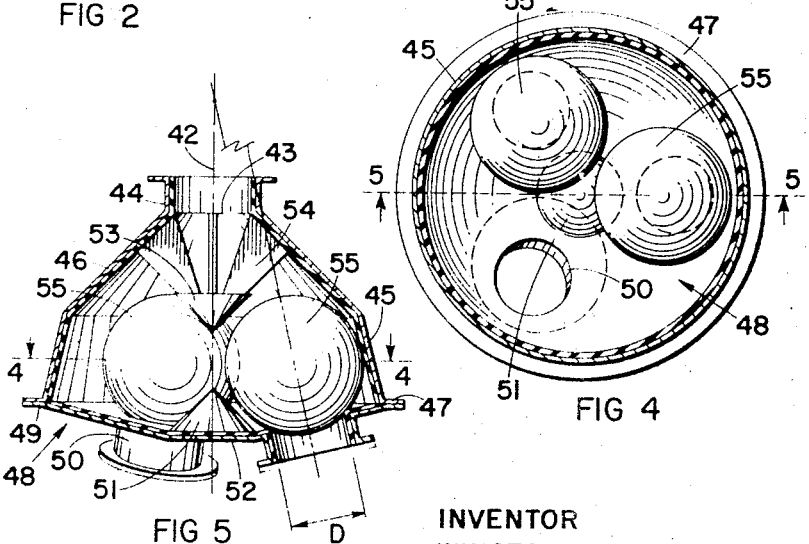
INVENTOR
WINSTON J. HARPER
BY Cavanagh & Norman

3,444,881
LARGE FREE BALL CHECK VALVE
Winston J. Harper, Rexdale, Ontario, Canada, assignor to The Technequip Company Limited, Weston, Ontario, Canada
Filed Dec. 11, 1967, Ser. No. 689,411
Int. Cl. G05d 11/03; F16k 21/08; F16l 7/00
U.S. Cl. 137—112                               7 Claims

ABSTRACT OF THE DISCLOSURE

This specification discloses a ball check valve of the free fall type comprising: a valve body, a plurality of inlet fittings defining ball valve inlet seats; an outlet fitting, at least one ball valve member of a diameter substantially greater than that of said inlet seats, and ball race means within said body spaced a ball clearance distance and extending support for said ball throughout a path of travel thereof from one inlet to an adjacent inlet seat.

---

This invention relates to a free ball check-valve structure adapted to be made in sizes up to one foot in ball diameter and greater.

The mass of a check valve ball (for example as shown in U.S. Patent 1,894,603 granted Jan. 17, 1933) increases as the cube of the diameter whereas the flow opening area through the valve seat increases as the square of the diameter. Thus when considering a ball check valve of large size the designer must observe that in doubling the apparent size of a vlave the weight of the ball will be tripled. In most applications is is necessary that the fluid pressure operating the free ball check valve must apply forces to the ball sufficient to overcome the force of gravity, usually not less than about twice the force of gravity. A twelve inch diameter ball of steel or even of rubber can in moving to and from a valve seat generate formidable shock forces. It is for this reason that for large valves designers have tended to keep the diameter of the ball relative to the diameter of the valve seat as small as possible. This results in a large seating angle for the ball in turn causing jamming of the ball in the valve seat. Attempts to place large free ball check-valves in use according to such prior knowledge results in early failure due to self destruction arising from large shock forces.

It is the main object of the invention to provide a free ball check-valve suitable for design and use in large sizes in a wide variety of industrial applications.

It is another object of the invention to provide a free ball check-valve in which the ball is vastly greater in diameter than the seating diameter combined with guide means for said ball which do not obstruct the flow path through the valve.

It is a further object of the invention to provide a free ball check-valve in which the ball is fully guided in its transfer motion from one valve seat to another.

It is a still further object of the invention to provide a free ball check-valve having a single outlet and more than two inlet opening valve seats with one or two ball members therefor.

With the foregoing and other objects in view the invention generally concerns a ball check-valve of the free ball type comprising, a valve body; a plurality of inlet fittings for said body defining similar ball valve inlet seats therein; an outlet fitting for said body; at least one ball valve member of a diameter substantially greater than that on inlet seats; and ball race means within said body spaced a ball clearance distance and extending support for said ball substantially throughout a path of travel thereof from one inlet to an adjacent inlet seat.

In the drawings:

FIGURE 1 is a perspective view of one form of valve of the invention connected to inlet lines communicating therethrough to a single outlet line.

FIGURE 2 is a sectional elevation of a two inlet ball check-valve construction of this invention.

FIGURE 3 is a secton on the line 3—3 of FIGURE 2,

FIGURE 4 is a sectional plan view of a check-valve of the invention having more than two inlets (three) and a number of ball valve members (two) one less than the number of inlet openings, FIGURE 5 is a section on the line 5—5 of FIGURE 4, FIGURE 6 is an hydraulic circuit diagram showing the valve of the invention in a fluid circuit with centrifugal pumps.

A single ball form of valve device of the invention is shown in FIGURES 1 to 3 and comprises a valve body 10 formed of side walls 11 welded to arcuate top wall 12 carrying outlet fitting 13 flanged as at 14 for connection to outlet pipe 15. An inlet structure 16 connects by bolted flanges 17 to inlet end flanges 18 of body 10. Triangular side walls 19 and plates 20, 21 are welded into an inlet structure with flanges 17 to support inlet fittings 22, 23 respectively on axes 24, 25 converging equally toward central axis 26 of outlet fitting 13. Flanges 27, 28 of inlet fittings 22, 23 are connectable by bolts to flanged inlet pipes 29, 30.

The inlet fittings 22, 23 at their juncture with plates 20, 21 define valve inlet seats by their inner edges 31, 32 adapted to receive elastomer ball member 33 of a diameter having a contacting or seating angle A therewith less than about 120 degrees and greater than about 80 degrees, whereby the ball is of a diameter between 1.12D and 1.41D or in any case at least ten percent (but less than fifty percent) greater in diameter than inlet diameter D. Too large a seating angle under high velocities of seating motion of the ball or high fluid pressure may result in jamming, whereas too small a seating angle may result in unstable seating and chatter or breakage due to turbulence of fluid motion through the valve body.

Preferably the complete interior of the valve body is lined with an elastomer lining 34 and ball race guide means are provided in the form of curved race structure 35 extending inwardly of the body 10 on an arc whose radius R extends from a centre 36 of curvature of pathway 37 of ball motion from one inlet seat to the other. Observe that said structures 35 as seen in FIGURE 3 are spaced apart a free open distance S within said body greater than inlet opening diameter D whereby to obviate any obstruction to liquid flow from an inlet opening to the outlet opening 38 of outlet fitting 13. Further, in order to avoid undue chattering in ball motion on path 37 a second race structure 39 rises in a conforming but close clearance curve with ball 33 from the juncture 40 of plates 20, 21. These are spaced so the ball rolls in contact with one or the other, permitting rapid but smooth transfer. Still further it is to be noted that the race guide means structure 35 is spaced a ball clearance distance greater than D/2 from outlet opening 38 to provide a clearance chamber 41 so that opening 38 is unobstructed during ball motion.

The form of the invention shown in FIGURES 1 to 3 is a special case of the general form shown in FIGURES 4 and 5. In general the valve of the invention may have one or more ball valve members but always at most one less than the number of inlet openings. Thus the structure shown in FIGURES 4 and 5 may be used with two ball valve members as shown with one depending upon the number of active input lines desired.

In the form of valve shown in FIGURES 1 to 3 the ball raceway axis 9 is transverse of the axis 26 of the outlet opening 38, whereas in the general form of FIGURES 4 and 5 the ball race axis 42 is coincident with the axis of the outlet opening 43 of outlet fitting 44. The frustoconical side walls 45, 46 of the valve body serve as peripheral guide means terminating in flange 47. Inlet structure 48 is of frustoconical form having a flange 49 adapted for bolt assembly with flange 47 and carries more than two inlet fittings, such as the three inlet fittings 50 spaced 120 degrees apart, equidistant from axis 42. Inner guide means in the form of conical guide member 51 on bottom wall 52 and downwardly projecting conical guide means 53 rigidly supported by heavy support members 54 depending from side walls 46 near outlet opening 43, cooperate with frustoconical side walls 45 to define a free area between said supports greater than the area of the outlet opening. Conical guide members 51 and 53 are mounted coaxially on the raceway and outlet opening axis 42. Balls 55 are of a diameter substantially greater than the effective inlet opening diameter. When two balls are employed with three inlet openings it is proposed that only one inlet opening be active at any one time thus the effective inlet opening may be of the same area as the outlet opening. Where, however, two active inlet openings are desired so that only one ball is employed in the form of valve shown in FIGURES 4 and 5, then the inlet connecting pipes for unchanged velocity at the outlet opening should be chosen so that the area of the outlet opening is equal to the total of the areas of the active inlet lines. Thus, for example, assuming a valve of the invention has a 12 inch outlet fitting, then 8½ inch inlet fittings should be selected. On the other hand, an increase of velocity through the outlet opening 43 may be permissible in the particular application, in which event the inlets may approach or equal the size of the common outlet line.

Any of the forms of the invention indicated may be connected as in FIGURE 6 showing valve structure 56. In the diagrammatic circuit shown, motors M drive centrifugal pumps P whereby liquid is pumped from reservoirs 57, 58, 59 through valve 56 and outlet line 60 thereof to receiving reservoir 61. There are several ways in which such circuit may be employed. If the valve 56 is of two inlet type only motor M may be started to drive pump 7 from reservoir 57 as soon as reservoir 58 is emptied sufficiently. Then motor M for pump 6 may be switched on immediately the motor for pump 7 is switched off. Fluid pressure from the active line will apply to the ball in valve 56 to move it in its raceway guide means to a zone of lower pressure, that is, toward the inactive inlet opening. The weight of said ball means is only significant in relation to the shock force set up and is not significant to the valve operation. In the general multiple form of the invention a third line (shown in broken lines in FIGURE 6) may be employed and the valve 56 used to combine the flows where one ball is used in a three inlet valve form. The invention contemplates the use of a single ball with a plurality of inlets for combining flows. The single ball will seat in the inactive inlet provided a race guide of the invention is employed as indicated in FIGURES 2 and 5. The race guide axis may be disposed transversely of the outlet axis, especially in the double inlet form of FIGURES 1 to 3. When a number of inlets greater than two are required it is preferred that the race axis and outlet axis be coincident as at 42 in the general forms of FIGURES 4 and 5.

What I claim as my invention is:

1. A ball check-valve of the free ball type comprising: a valve body having an outlet opening and a plurality of inlet fittings defining inlet ball valve seats of the same diameter; at least one ball valve member of a diameter substantially greater than said seat diameter of a seating angle between about eighty degrees and about one hundred and twenty degrees therewith; and arcuate ball race guide means within said body projecting to support said ball substantially throughout an arcuate path of travel from one inlet seat to an adjacent inlet seat.

2. A ball check-valve as claimed in claim 1, in which said valve body and race guide means therein establish an unobstructed flow path between said inlet seats and said outlet opening.

3. A ball check-valve as claimed in claim 1, in which the ball member is formed entirely from an elastomer material.

4. A ball check-valve as claimed in claim 1 in which there is one ball member and two inlet seats only and wherein said race guide means are in the form of arcuate rail-like members extending inwardly from the valve body.

5. A ball check-valve as claimed in claim 1 in which there are provided three inlet valve seats and one ball member.

6. A ball check-valve as claimed in claim 1 in which the seating angle is less than ninety degrees.

7. A ball check-valve as claimed in claim 1 in which the arcuate path of said ball is in a plane at right angles to an axis of said body coincident with the axis of said outlet opening.

References Cited
UNITED STATES PATENTS

| | | | |
|---|---|---|---|
| 315,521 | 4/1885 | Lord | 137—113 |
| 3,105,516 | 10/1963 | Werra | 137—533.11 |
| 3,343,564 | 9/1967 | Peeples | 137—539 |

HAROLD W. WEAKLEY, *Primary Examiner.*

U.S. Cl. X.R.

137—375, 533.11, 533.19